US008045958B2

(12) United States Patent
Kahandaliyanage

(10) Patent No.: US 8,045,958 B2
(45) Date of Patent: Oct. 25, 2011

(54) SYSTEM AND METHOD FOR APPLICATION PROGRAM OPERATION ON A WIRELESS DEVICE

(75) Inventor: Shawn Kahandaliyanage, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 324 days.

(21) Appl. No.: 11/282,564

(22) Filed: Nov. 21, 2005

(65) Prior Publication Data
US 2007/0118558 A1    May 24, 2007

(51) Int. Cl.
*H04M 1/66* (2006.01)
(52) U.S. Cl. ........ 455/410; 455/411; 455/418; 455/419; 455/420
(58) Field of Classification Search .................. 455/418, 455/419, 420, 186.1, 557, 558, 410, 411; 709/203, 206, 224
See application file for complete search history.

(56) References Cited

U.S. PATENT DOCUMENTS

| | | | |
|---|---|---|---|
| 5,261,102 A | 11/1993 | Hoffman | |
| 5,560,008 A | 9/1996 | Johnson et al. | |
| 5,778,348 A | 7/1998 | Manduley et al. | |
| 5,944,821 A | 8/1999 | Angelo | |
| 5,977,821 A | 11/1999 | Shibata | |
| 6,061,794 A | 5/2000 | Angelo et al. | |
| 6,065,054 A | 5/2000 | Dutcher et al. | |
| 6,101,607 A | 8/2000 | Bachand et al. | |
| 6,167,445 A | 12/2000 | Gai et al. | |
| 6,167,521 A | 12/2000 | Smith et al. | |
| 6,192,476 B1 | 2/2001 | Gong | |
| 6,202,207 B1 | 3/2001 | Donohue | |
| 6,212,635 B1 | 4/2001 | Reardon | |
| 6,216,116 B1 | 4/2001 | Barkan et al. | |
| 6,487,665 B1 | 11/2002 | Andrews et al. | |
| 6,513,121 B1 | 1/2003 | Serkowski | |
| 6,922,782 B1 | 7/2005 | Spyker et al. | |
| 6,931,379 B1 | 8/2005 | Sato et al. | |
| 6,941,355 B1 | 9/2005 | Donaghey et al. | |
| 7,546,956 B2 | 6/2009 | Adams et al. | |
| 7,815,100 B2 | 10/2010 | Adams et al. | |
| 2001/0002485 A1 | 5/2001 | Bisbee et al. | |
| 2001/0007133 A1 | 7/2001 | Moriconi et al. | |
| 2001/0032188 A1 | 10/2001 | Miyabe et al. | |
| 2002/0183056 A1 | 12/2002 | Lundblade et al. | |
| 2003/0023774 A1* | 1/2003 | Gladstone et al. ............ | 709/328 |

(Continued)

FOREIGN PATENT DOCUMENTS

CA    2579541    8/2007

(Continued)

OTHER PUBLICATIONS

Nobels, Jonathan, Research in Motion Limited, "Give Me A Sign", BlackBerry Developer Journal, Writing Efficient 32ME Software, 3 pages, May 2004 http://www.blackberry.com/developers/journal/may_2004/give_me_a_sign.shtml.

(Continued)

*Primary Examiner* — Ajit Patel
*Assistant Examiner* — Khai M Nguyen
(74) *Attorney, Agent, or Firm* — Bereskin & Parr LLP/S.E.N.C.R.L.,s.r.l.

(57) ABSTRACT

Embodiments described herein address mobile devices with non-secure operating systems that do not provide a sufficient security framework. More particularly, the embodiments described herein provide a set of applications to the device for providing security features to the non-secure operating system.

15 Claims, 6 Drawing Sheets

U.S. PATENT DOCUMENTS

| | | | |
|---|---|---|---|
| 2003/0081621 | A1 | 5/2003 | Godfrey et al. |
| 2003/0135555 | A1 | 7/2003 | Birrel et al. |
| 2003/0191719 | A1 | 10/2003 | Ginter et al. |
| 2003/0233577 | A1 | 12/2003 | Bellino |
| 2004/0039911 | A1 | 2/2004 | Oka et al. |
| 2004/0078565 | A1 | 4/2004 | Hofmeister et al. |
| 2004/0177270 | A1 | 9/2004 | Little et al. |
| 2004/0260760 | A1 | 12/2004 | Curnyn |
| 2005/0050319 | A1 | 3/2005 | Suraski |
| 2005/0129042 | A1 | 6/2005 | Muhonen et al. |
| 2005/0190083 | A1 | 9/2005 | Tyneski et al. |
| 2005/0198179 | A1 | 9/2005 | Savilampi |
| 2005/0252963 | A1 | 11/2005 | Adams et al. |
| 2005/0257209 | A1 | 11/2005 | Adams et al. |
| 2005/0278419 | A1 | 12/2005 | Morris |
| 2006/0168046 | A1 | 7/2006 | Qureshi |
| 2006/0272028 | A1 | 11/2006 | Maes |
| 2006/0282896 | A1 | 12/2006 | Qi |
| 2007/0204324 | A1 | 8/2007 | Roberts et al. |
| 2007/0204326 | A1 | 8/2007 | Bocking et al. |
| 2007/0294744 | A1 | 12/2007 | Alessio et al. |
| 2009/0224036 | A1 | 9/2009 | Adams et al. |

FOREIGN PATENT DOCUMENTS

| | | |
|---|---|---|
| CA | 2619196 | 8/2008 |
| EP | 0813132 | 12/1997 |
| EP | 0828209 | 3/1998 |
| EP | 1168141 | 1/2002 |
| EP | 1185923 B1 | 3/2004 |
| EP | 1427166 | 6/2004 |
| EP | 1465041 | 6/2004 |
| EP | 1826944 | 5/2009 |
| GB | 2312767 | 5/1997 |
| GB | 2333865 | 4/1999 |
| GB | 2378780 | 2/2003 |
| JP | 2002056360 | 2/2002 |
| JP | 2002091598 | 3/2002 |
| JP | 2002170063 | 6/2002 |
| JP | 2002182963 | 6/2002 |
| WO | 9844404 | 10/1998 |
| WO | WO 99/45454 | 9/1999 |
| WO | WO 00/56027 | 9/2000 |
| WO | 200060434 | 10/2000 |
| WO | 200171590 | 9/2001 |
| WO | 0177811 | 10/2001 |
| WO | 200178395 | 10/2001 |
| WO | 2002097620 | 12/2002 |
| WO | 03058411 | 7/2003 |
| WO | 03063524 | 7/2003 |
| WO | 2005106678 A1 | 11/2005 |

OTHER PUBLICATIONS

Research in Motion Limited, BlackBerry Wireless application deployment in the enterprise, originally posted: Feb. 2003, last revised: Jul. 2003, 4 pages, www.blackberry.com.
Research in Motion Limited, BlackBerry Application Security for Java-based BlackBerry Handhelds, originally posted: Feb. 2003, 5 pages, www.blackberry.com.
Research in Motion Limited, BlackBerry Security White Paper Release 4.0, 2004, www.blackberry.com.
Research in Motion Limited, BlackBerry Java Development Environment Version 3.6 Developer Guide vol. 2—Advanced Topics, Mar. 24, 2003, chapter 1, Using Controlled APIs.
Research in Motion Limited, Controlled APIs, 3 pages from blackberry.com printed Dec. 2, 2004 http://www.blackberry.com/developers/na/java/tools/controllledAPIs.shtml.
Research in Motion Limited, BlackBerry IT Policy Manager, 19 pages, 2002.
Research in Motion Limited, Implementing the IT Policy Manager for BlackBerry, 12 pages, originally posted Mar. 2002.
Research in Motion Limited, Wireless IT Policy and IT Administration BlackBerry Enterprise Server version 3.5 for Microsoft Exchange, 17 pages, 2002.
Search/Exam Report for EP patent application No. 06110449 dated May 29, 2006.
Exam Report for EP patent application No. 06110449.3, dated Mar. 30, 2007.
Exam Report for EP patent application No. 05111046 dated Jun. 28, 2007.
Summons to Attend Oral Proceedings for corresponding EP patent application No. EP 05111046.8 dated Apr. 10, 2008.
European Decision dated Dec. 16, 2008, European Application No. 05111046.8.
Co-pending U.S. Appl. No. 11/362,481, "Method Customizing a Standardized IT Policy", filed Feb. 27, 2006. (Retrievable from PAIR).
Office Action dated Jul. 20, 2009, U.S. Appl. No. 11/362,481.
Co-pending U.S. Appl. No. 11/679,470, "Method of Customizing a Standardized IT Policy", filed Feb. 27, 2007. (Retrievable from PAIR).
Canadian Office Action dated Aug. 31, 2009, Canadian Patent Application No. 2,567,715.
Office Action Response dated Oct. 20, 2009, U.S. Appl. No. 11/362,481.
Final Office Action dated Mar. 9, 2010, U.S. Appl. No. 11/362,481.
Office Action dated Nov. 9, 2009, U.S. Appl. No. 11/679,470.
Office Action Response dated Jan. 28, 2010, U.S. Appl. No. 11/679,470.
Co-pending U.S. Appl. No. 11/118,844, "System and Method of Owner Application Control of Electronic Devices", filed Apr. 29, 2005. (Retrievable from PAIR).
Office Action dated May 29, 2008, U.S. Appl. No. 11/118,844.
Office Action Response dated Dec. 1, 2008, U.S. Appl. No. 11/118,844.
Office Action dated Mar. 10, 2009, U.S. Appl. No. 11/118,844.
Office Action Response dated May 8, 2009, U.S. Appl. No. 11/118,844.
Office Action dated Aug. 20, 2009, U.S. Appl. No. 11/118,844.
Office Action Response dated Nov. 19, 2009, U.S. Appl. No. 11/118,844.
Notice of Allowance dated Feb. 23, 2010, U.S. Appl. No. 11/118,844.
BOS, "Re: CCS: Extended tiling. Proposal", [online] May 5, 2004, pp. 1-2, XP002462798, www-style@w3.org, http://lists.w3.org/Archives/Public/www-style/2004May/0020.html.
W3C, "CSS3 Border Module" [online] Nov. 7, 2002, pp. 1-14, XP002462799, www.w3.org/TR/2002/WD-css3-border-20021107/.
W3C, "CSS3 Backgrounds and Borders Module" [online] Feb. 16, 2005, pp. 1-29, XP002462800, www.w3.org/TR/2005/WD-css3-backrounds-20050216/.
Co-pending U.S. Appl. No. 12/468,441, "System and Mehtod of Operation Control on an Electronic Device", filed May 19, 2009. (Retrievable from PAIR).
Rooker. T: "The Reference Monitor: An Idea Whose Time Has Come" Proceedings. ACM SIGSAC New Security Paradigms Workshop, Proceedings of New Security Paradigms Workshop, Aug. 3, 1993, pp. 192-197, XP001147934.
Microsoft: "Computer Dictionary" Microsoft Press, Dec. 31, 2002, p. 33, XP001147934.
Extended European Search and Examination Report for corresponding EP patent application No. EP 05 11 1046 dated Jun. 9, 2006.
United States Office Action dated May 24, 2010, U.S. Appl. No. 11/679,470.
United States Office Action Response dated Aug. 5, 2010, U.S. Appl. No. 11/679,470.
United States Office Action dated Mar. 22, 2010, U.S. Appl. No. 12/468,441.
United States Office Action Response dated Jun. 22, 2010, U.S. Appl. No. 12/468,441.
United States Notice of Allowance dated Aug. 11, 2010, U.S. Appl. No. 12/468,441.
Takaragi; Angou Houshiki to Ouyou [Encryption System and Application]; Journal of Information Processing; vol. 32, No. 6; Japan Information Processing Society of Japan; Jun. 1991; pp. 714-723.
United States Office Action Response dated Jun. 4, 2010, U.S. Appl. No. 11/362,481.
Amendment dated May 24, 2010, U.S. Appl. No. 11/118,844.
United States Notice of Allowance dated Jun. 10, 2010, U.S. Appl. No. 11/118,844.

Co-pending U.S. Appl. No. 12/885,281, filed Sep. 17, 2010.
Office Action. U.S. Appl. No. 11/362,481. Dated: Feb. 17, 2011.
Office Action. U.S. Appl. No. 11/679,470. Dated: Feb. 18, 2011.
Amendment/Response. U.S. Appl. No. 11/679,470. Dated: Apr. 19, 2011.

United States Office Action dated Jul. 6, 2011, U.S. Appl. No. 11/362,481.
Office Action Response dated May 9, 2011, U.S. Appl. No. 11/362,481.

* cited by examiner

SYSTEM AND METHOD FOR APPLICATION PROGRAM OPERATION ON A WIRELESS DEVICE

FIELD

The embodiments described herein relate generally to wireless devices, and more particularly to providing a secure environment for applications running on wireless devices with non-secure operating systems.

BACKGROUND

Wireless devices, hereafter referred to as mobile devices, include mobile phones, and mobile e-mail devices that typically have applications which allow users of these devices to perform a wide variety of functions including accessing or sending information, playing games, etc. These applications may be installed during the manufacture of these devices. Alternatively, these applications may be made by a third party and installed after the manufacture of these devices.

The operating system of a mobile device provides an application programming interface (API) that provides access to data which may be sensitive and a task manager for controlling application execution. However, typical operating systems lack a robust framework for addressing security and manageability of API access control as well as application control. Accordingly, sensitive APIs (i.e. APIs that provide access to sensitive information) may be accessed by rogue applications without passing through any security framework. For example, a sensitive API can be an API that allows access to a database of a corporate e-mail application. That being said, there are legitimate uses of APIs that must also be taken into consideration. In addition, non-secure operating systems on a mobile device often have no framework for allowing IT administrators to control which applications can be executed. Both API access control and application control for mobile systems are of particular concern to IT administrators who have a responsibility to protect confidential corporate information that reside on or are accessible by mobile devices.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment and in which.

DETAILED DESCRIPTION

Figure 1:
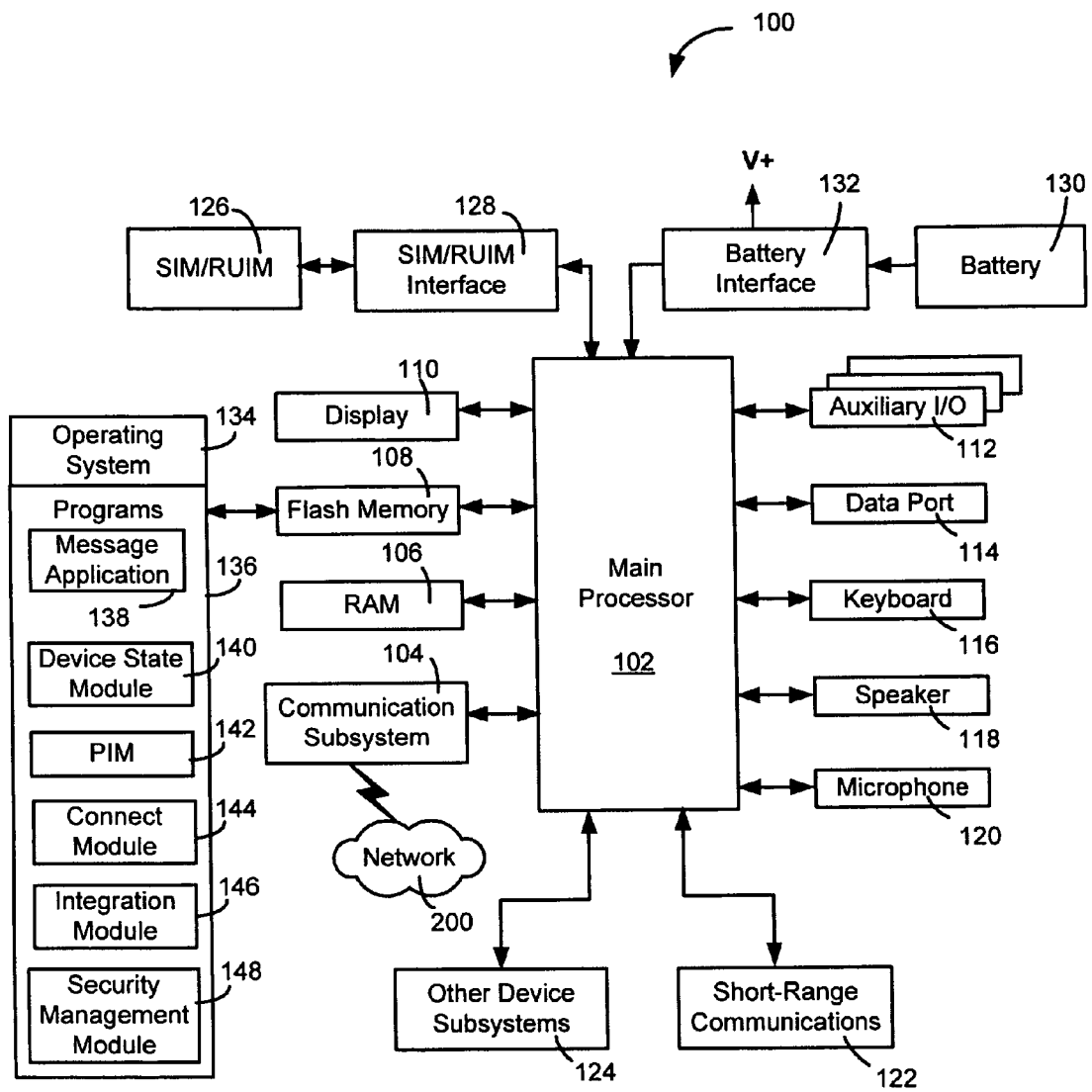
FIG. 1 is a block diagram of an exemplary embodiment of a mobile device.

It will be appreciated that for simplicity and clarity of illustration, elements shown in the figures have not necessarily been drawn to scale. Further, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The embodiments described herein generally relate to a mobile wireless communication device, hereafter referred to as a mobile device, that has a non-secure operating system. Examples of applicable communication devices include pagers, cellular phones, cellular smart-phones, wireless organizers, personal digital assistants, computers, laptops, handheld wireless communication devices, wirelessly enabled notebook computers and the like.

The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device and how it communicates with other devices and host systems, reference will now be made to FIGS. 1 through 4.

Referring first to FIG. 1, shown therein is a block diagram of an exemplary embodiment of a mobile device 100. The mobile device 100 includes a number of components such as a main processor 102 that controls the overall operation of the mobile device 100. Communication functions, including data and voice communications, are performed through a communication subsystem 104. The communication subsystem 104 receives messages from and sends messages to a wireless network 200. In this exemplary implementation of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile device 100 is a GSM/GPRS wireless network in one exemplary implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 may send and receive communication signals over the wireless network 200 after required network registration or activation procedures have been completed. Network access is associated with a subscriber or user of the mobile device 100. To identify a subscriber, the mobile device 100 requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The mobile device 100 is a battery-powered device and includes a battery interface 132 for receiving one or more rechargeable batteries 130. In some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 148 which are described in more detail below. The operating system 134 and the software components 136 to 148 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 148, such as specific device applications, or parts thereof, may be temporarily loaded into a volatile store such as the RAM 106.

The operating system 134, in the absence of additional software components or controls, is a non-secure operating system which lacks a comprehensive security and management framework. This results in a number of shortcomings in areas such as: user authentication (ensuring that only the intended user can access the device 100), memory security (ensuring that an application's data in memory is private to that application only), flash security (ensuring that an application's data in flash memory is private to that application only), and API security (ensuring that only authorized applications can access sensitive APIs), as well as other security issues.

The subset of software applications 136 that control basic device operations, including data and voice communication applications, will normally be installed on the mobile device 100 during its manufacture. Other software applications 136 include a message application 138 that can be any suitable software program that allows a user of the mobile device 100 to send and receive electronic messages. Various alternatives exist for the message application 138 as is well known to those skilled in the art. Messages that have been sent or received by the user are typically stored in the flash memory 108 of the mobile device 100 or some other suitable storage element in the mobile device 100. In some embodiments, some of the sent and received messages may be stored remotely from the device 100 such as in a data store of an associated host system that the mobile device 100 communicates with.

The message application 138 can include an address book that provides information for a list of contacts for the user. For a given contact in the address book, the information can include the name, phone number, work address and e-mail address of the contact, among other information. In some embodiments, the address book may be a separate software application.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 100 is turned off or loses power.

The PIM 142 includes functionality for organizing and managing data items of interest to the user, such as, but not limited to, e-mail, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

Other types of software applications can also be installed on the mobile device 100. These software applications can be third party applications which are added after the manufacture of the mobile device 100. Examples of third party applications may be games, calculators, or other utilities. Unfortunately, if these applications have a malicious intent, the non-secure operating system 134 cannot properly limit or prevent the operation of these malicious applications without additional support.

Advantageously, the mobile device 100 can operate with a set of applications that provide security features including a connect module 144, an integration module 146 and a security management module 148. These modules can be installed after the manufacture of the mobile device 100 to provide extra functionality for the mobile device 100. These modules can also provide security features for the mobile device 100 to mitigate the security and management shortcomings of the non-secure operating system 134.

The connect module 144 implements the communication protocols that are required for the mobile device 100 to communicate with the wireless infrastructure and any host system, such as an enterprise system, that the mobile device 100 is authorized to interface with. Examples of a wireless infrastructure and an enterprise system are given in FIGS. 3 and 4, which are described in more detail below. The connect module 144 includes a set of APIs that can be integrated with the mobile device 100 to allow the mobile device 100 to use any number of services associated with the enterprise system. The connect module 144 allows the mobile device 100 to establish an end-to-end secure, authenticated communication pipe with the host system. A subset of applications for which access is provided by the connect module 144 can be used to pass IT policy commands from the host system to the mobile device 100. These instructions can then be passed to the security management module 148 to modify the security and management features of the device 100. Alternatively, in some cases, the IT policy update can also be done over a wired connection.

The integration module 146 is an interface between the APIs that can be provided by the connect module 144 and the host environment of the mobile device 100 which includes the operating system 134, any applications 136, network services, etc. Accordingly, the integration module 146 includes several sub-modules (not shown) that integrate the APIs provided by the connect module 144 with host environment APIs including APIs of the operating system 134, APIs of the applications 136 that are executed by the mobile device 100 (i.e. the message application 138), APIs associated with the communication subsystem 104 and the like. When the connect and integration modules 144 and 146 are installed on the mobile device 100, the integration module 146 begins carrying out tasks to provide services to the mobile device 100 via the APIs of the connect module 144.

The integration module 146 does not make any changes to the device environment per se, but augments the behavior of the device environment and the applications 136 by interfacing with the corresponding APIs. In this fashion, the integration module 146 in combination with the security management module 148 can affect the security capabilities of the non-secure operating system 134. The security management module 148 can provide several security features including at least one of application execution control, API access control, user authentication, device data removal, application feature-specific control, and the like. The security management module 148 is described in more detail below.

The additional applications can be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

The short-range communications subsystem 122 provides for communication between the mobile device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 2:
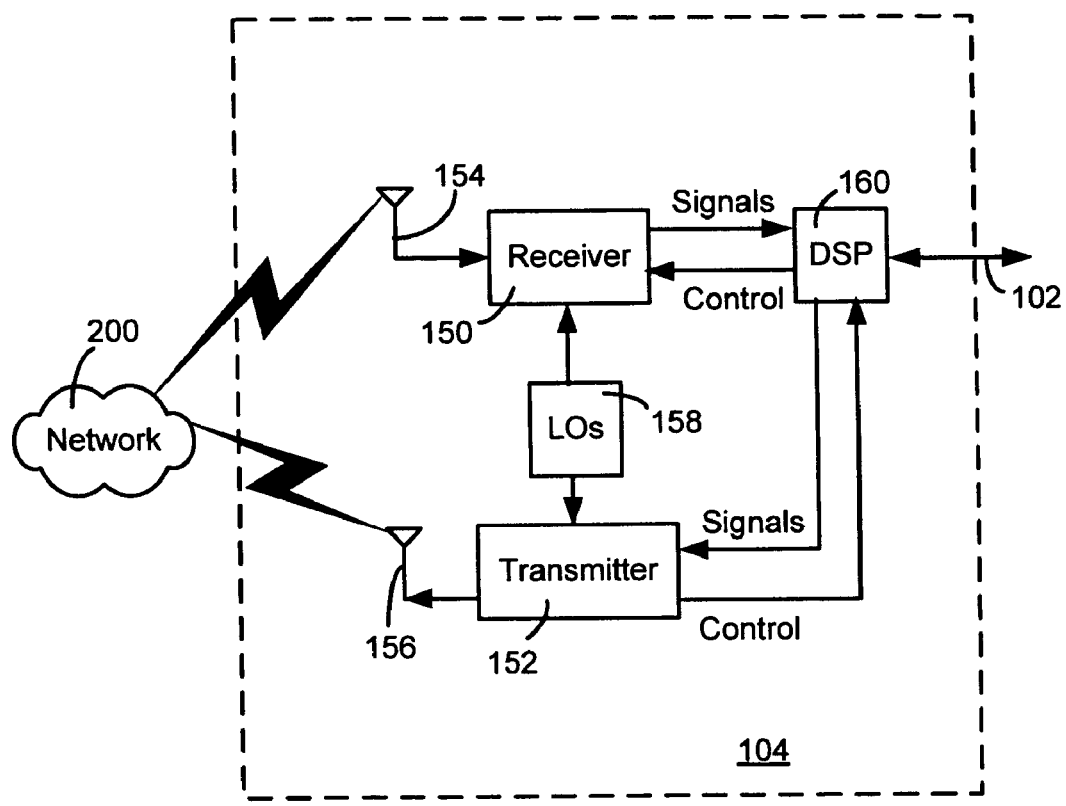
FIG. 2 is a block diagram of an exemplary embodiment of a communication subsystem component of the mobile device of FIG. 1.

Referring now to FIG. 2, an exemplary block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the mobile device 100 is intended to operate. Thus, it should be understood that the design illustrated in FIG. 2 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 3:
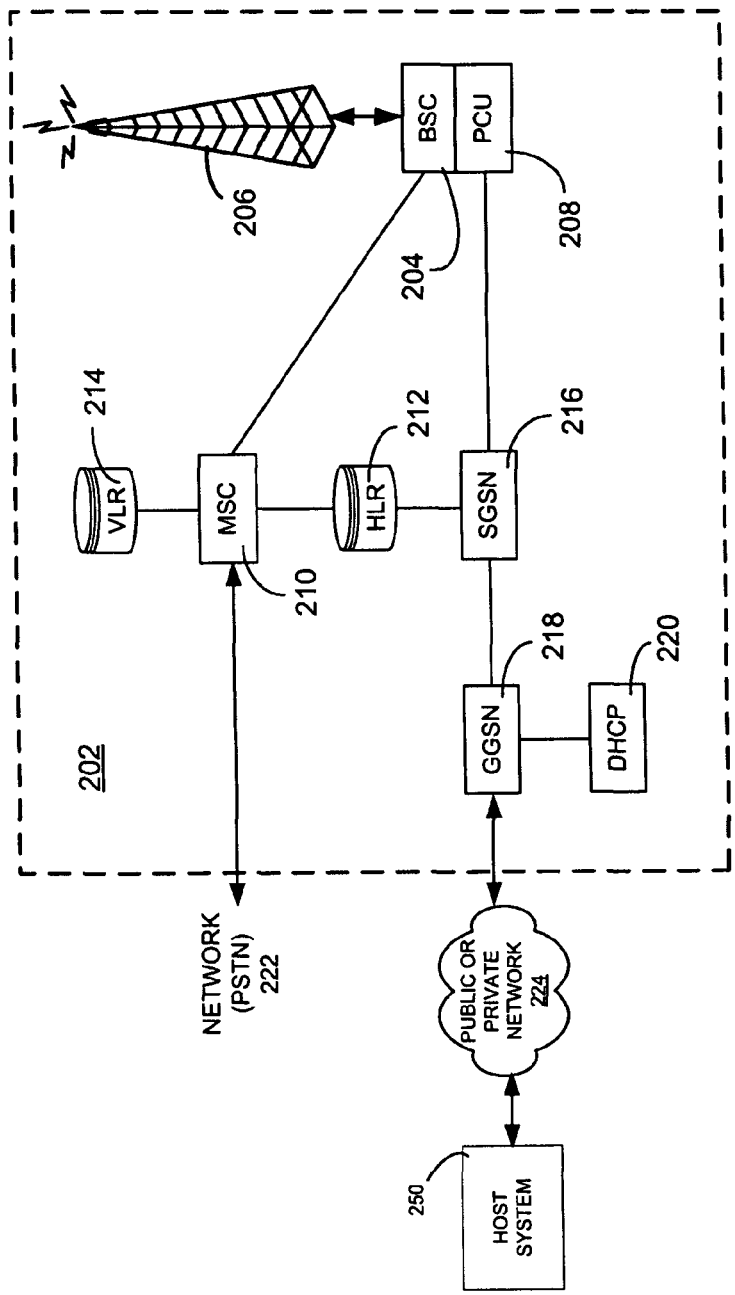
FIG. 3 is an exemplary block diagram of a node of a wireless network.

Referring now to FIG. 3, a block diagram of an exemplary implementation of a node 202 of the wireless network 200 is shown. In practice, the wireless network 200 comprises one or more nodes 202. In conjunction with the connect module 144, the mobile device 100 can communicate with the node 202 within the wireless network 200. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the mobile device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a mobile device 100 is not using its PDP Context, the PDP Context can be de-allocated and the IP address returned to the IP address pool managed by the DHCP server 220.

Figure 4:
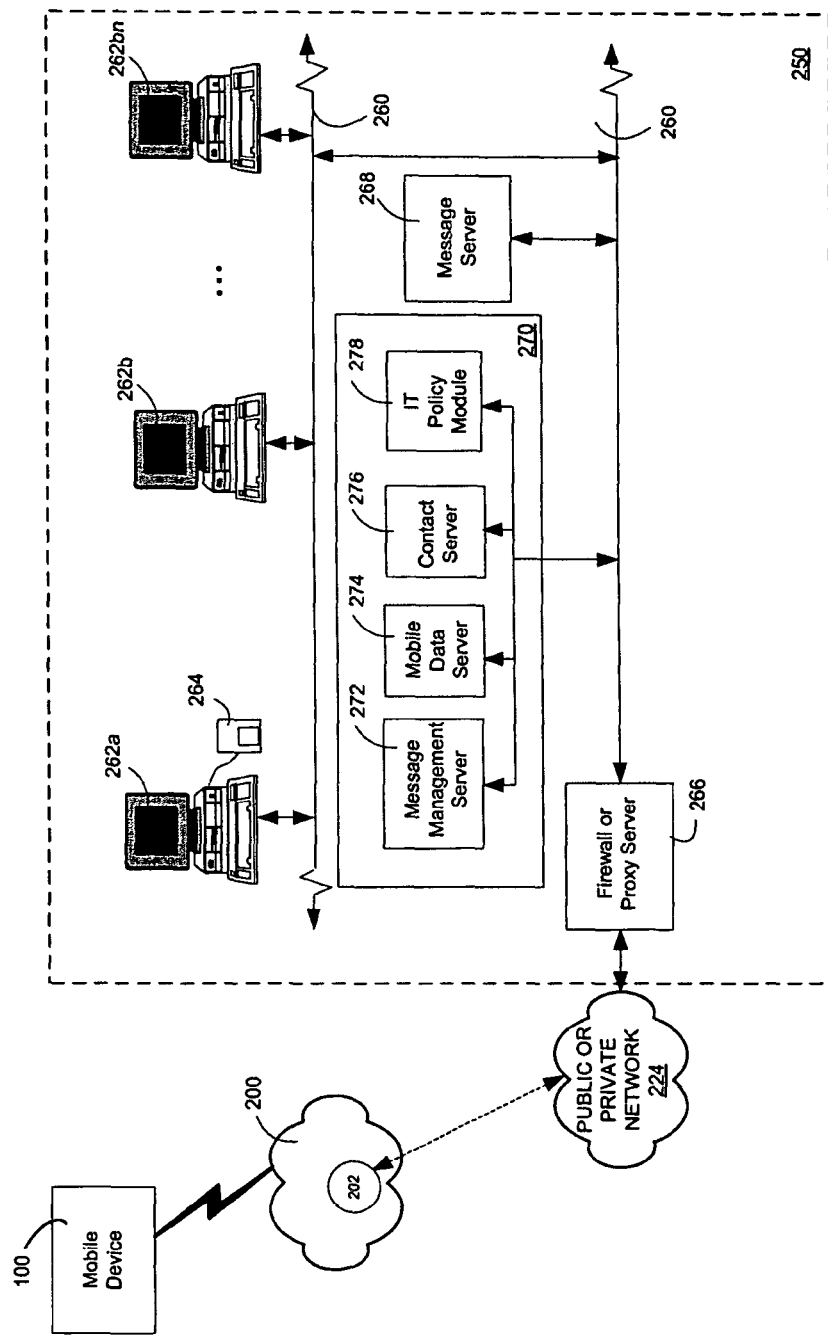
FIG. 4 is a block diagram illustrating components of a host system in one exemplary configuration for use with the wireless network of FIG. 3 and the mobile device of FIG. 1.

Referring now to FIG. 4, shown therein is a block diagram illustrating components of an exemplary configuration of a host system 250 that the mobile device 100 can communicate with in conjunction with the connect module 144. The host system 250 will typically be a corporate enterprise or other local area network (LAN), but may also be a home office computer or some other private system, for example, in variant implementations. In this example shown in FIG. 4, the host system 250 is depicted as a LAN of an organization to which a user of the mobile device 100 belongs. Typically, a plurality of mobile devices can communicate wirelessly with the host system 250 through one or more nodes 202 of the wireless network 200.

The host system 250 comprises a number of network components connected to each other by a network 260. For instance, a user's desktop computer 262*a* with an accompanying cradle 264 for the user's mobile device 100 is situated on a LAN connection. The cradle 264 for the mobile device 100 can be coupled to the computer 262*a* by a serial or a Universal Serial Bus (USB) connection, for example. Other user computers 262*b* are also situated on the network 260, and each may or may not be equipped with an accompanying cradle 264. The cradle 264 facilitates the loading of information (e.g. PIM data, private symmetric encryption keys to facilitate secure communications between the mobile device 100 and the host system 250, etc) from the user computer 262*a* to the mobile device 100, and may be particularly useful for bulk information updates often performed in initializing the mobile device 100 for use. The information downloaded to the mobile device 100 may include certificates used in the exchange of messages.

It will be understood by persons skilled in the art that the user computers 262*a*-262*n* will typically also be connected to other peripheral devices, such as printers, etc. which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this exemplary configuration. More generally, the host system 250 may represent a smaller part of a larger network (not shown) of the organization, and may comprise different components and/or be arranged in different topologies than that shown in the exemplary embodiment of FIG. 4.

To facilitate the wireless communication of messages and message-related data between the mobile device 100 and components of the host system 250, a number of wireless communication support components 270 may be provided. In some implementations, the wireless communication support components 270 can include a message management server 272, a mobile data server 274, a contact server 276, an IT policy module 278, and the like.

In this exemplary embodiment, the mobile device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the mobile device 100. The wireless VPN router allows a VPN connection to be established directly through a specific wireless network to the mobile device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 100 in this alternative implementation.

Messages intended for a user of the mobile device 100 are initially received by a message server 268 of the host system 250. Such messages may originate from any number of sources. For instance, a message may have been sent by a sender from the computer 262*b* within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino™ server, a Novell Groupwise™ server, or another suitable mail server installed in a corporate environment. In some implementations, the host system 250 may comprise multiple message servers 268. The message server 268 may also be adapted to provide additional functions beyond message management, including the management of data associated with calendars and task lists, for example.

When messages are received by the message server 268, they are typically stored in a data store associated with the message server 268. In some embodiments, the data store may be a separate hardware unit (not shown) that the message server 268 communicates with. Messages can be subsequently retrieved and delivered to users by accessing the message server 268. For instance, an e-mail client application operating on a user's computer 262a may request the e-mail messages associated with that user's account stored on the data store associated with the message server 268. These messages are then retrieved from the data store and stored locally on the computer 262a. The data store associated with the message server 268 can store copies of each message that is locally stored on the mobile device 100. Alternatively, the data store associated with the message server 268 can store all of the messages for the user of the mobile device 100 and only a smaller number of messages can be stored on the mobile device 100 to conserve memory. For instance, the most recent messages (i.e. those received in the past two to three months for example) can be stored on the mobile device 100.

When operating the mobile device 100, the user may wish to have e-mail messages retrieved for delivery to the mobile device 100. The message application 138 operating on the mobile device 100 may also request messages associated with the user's account from the message server 268. The message application 138 may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 100 is assigned its own e-mail address, and messages addressed specifically to the mobile device 100 are automatically redirected to the mobile device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the mobile device 100. The message management server 272 also facilitates the handling of messages composed on the mobile device 100, which are sent to the message server 268 for subsequent delivery.

For example, the message management server 272 may monitor the user's "mailbox" (e.g. the message store associated with the user's account on the message server 268) for new e-mail messages, and apply user-definable filters to new messages to determine if and how the messages are relayed to the user's mobile device 100. The message management server 272 may also compress and encrypt new messages (e.g. using an encryption technique such as Data Encryption Standard (DES) or Triple DES) and push them to the mobile device 100 via the shared network infrastructure 224 and the wireless network 200. The message management server 272 may also receive messages composed on the mobile device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the mobile device 100 can be defined (e.g. by an administrator in accordance with IT policy) and enforced by the message management server 272. These may include whether the mobile device 100 may receive encrypted and/or signed messages, minimum encryption key sizes, whether outgoing messages must be encrypted and/or signed, and whether copies of all secure messages sent from the mobile device 100 are to be sent to a pre-defined copy address, for example.

The message management server 272 may also be adapted to provide other control functions, such as only pushing certain message information or pre-defined portions (e.g. "blocks") of a message stored on the message server 268 to the mobile device 100. For example, in some cases, when a message is initially retrieved by the mobile device 100 from the message server 268, the message management server 272 may push only the first part of a message to the mobile device 100, with the part being of a pre-defined size (e.g. 2 KB). The user can then request that more of the message be delivered in similar-sized blocks by the message management server 272 to the mobile device 100, possibly up to a maximum pre-defined message size. Accordingly, the message management server 272 facilitates better control over the type of data and the amount of data that is communicated to the mobile device 100, and can help to minimize potential waste of bandwidth or other resources.

The mobile data server 274 encompasses any other server that stores information that is relevant to the corporation. The mobile data server 274 may include, but is not limited to, databases, online data document repositories, customer relationship management (CRM) systems, or enterprise resource planning (ERP) applications.

The contact server 276 can provide information for a list of contacts for the user in a similar fashion as the address book on the mobile device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the contact server 276 and the IT policy module 278 need not be implemented on separate physical servers within the host system 250. For example, some or all of the functions associated with the message management server 272 may be integrated with the message server 268, or some other server in the host system 250. Furthermore, the host system 250 may comprise multiple message management servers 272, particularly in variant implementations where a large number of mobile devices need to be supported. Furthermore, in some embodiments, the functionality of the IT policy module 278 can be provided by an IT policy server (not shown).

Figure 5:
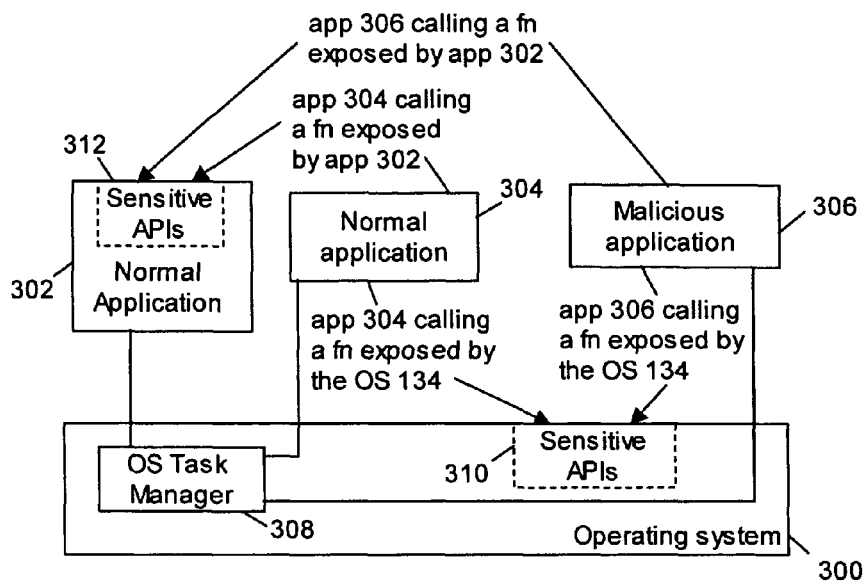
FIG. 5 is a block diagram of an exemplary embodiment of a non-secure operating system with several applications that may be executed on the mobile device of FIG. 1.

Referring now to FIG. 5, shown therein is an exemplary embodiment of a non-secure operating system 300 and several applications 302, 304, and 306 that may be executed on the mobile device 100. The operating system 300 includes a task manager 308 and at least one sensitive API 310 that is exposed. The term "exposed" means that the API 310 may provide access to sensitive information through corresponding functions and is freely accessible by any application that is executed by the operating system 300. The API 310 may also invoke sensitive processing, or any other functionality that can be considered detrimental to any enterprise system that the device 100 interfaces with, the user, or the user's data. For instance, examples of sensitive APIs include the PIM 142 and the message application 138. The PIM 142 allows a developer to access a user's PIM data which may be a security risk to the end user. The message application 138 allows a developer to send SMS messages which is a potential risk to the network operator and the end user. The operating system 300 will typically have other APIs and only a few sensitive APIs are shown for simplicity.

The OS Task manager 308 is responsible for the applications that are currently being executed by the operating system 300 and includes information for these applications. The OS Task manager 308 controls and schedules the execution of the applications 302, 304 and 306 and can also be used to terminate the execution of any application currently executing.

The application 302 is an example of an acceptable or normal application that includes a sensitive API 312 that provides functions which can access sensitive data or perform sensitive operations and is freely accessible by any application that is executed by the operating system 300 without the additional control provided by the security management module 148. The application 304 is also an example of a normal application and the application 306 is an example of a rogue or malicious application. In this example, any application, regardless of whether or not it contains malicious code is allowed to be executed by the operating system 300 and may freely access the application API 312 or the operation system API 310 without the additional control provided by the security management module 148. Furthermore, any application that is loaded onto the mobile device 100 is permitted to run which may not be acceptable if the application contains malicious code.

In acceptable scenarios, the application 304 may call a sensitive function or read data that is exposed by the API 312 of application 302 or by the API 310 of the operating system 300. In both of these cases, the operation of the application 304 is acceptable since the functions accessed, or the data read, by the application 304 are used for legitimate purposes.

In unacceptable scenarios, the application 306 may call a sensitive function or read data that is exposed by the API 312 of application 302 or by the API 310 of the operating system 300. In both of these cases, the operation of the application 306 is unacceptable since the functions accessed, or the data read, by the application 306 may be used for malicious purposes.

Figure 6:
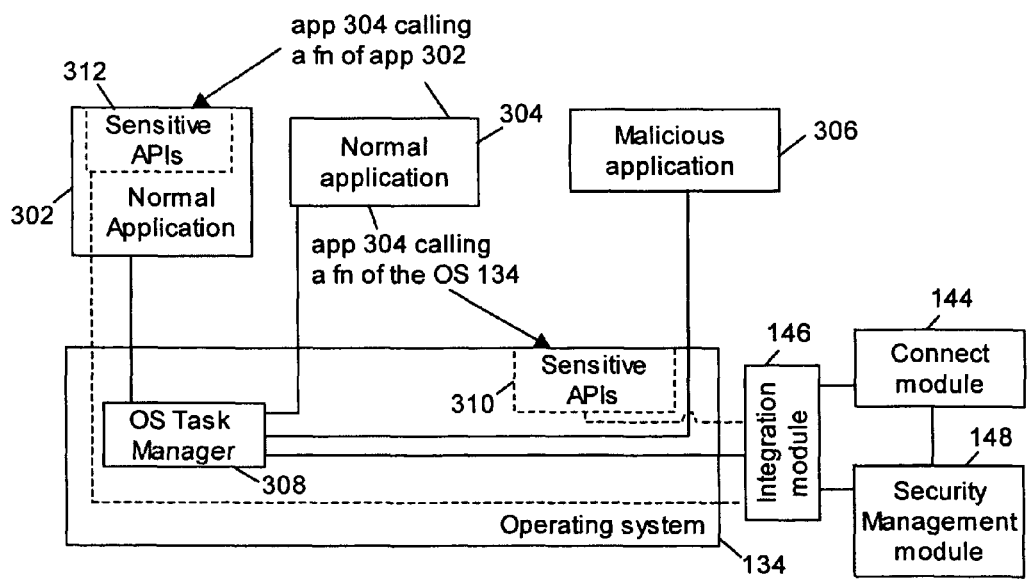
FIG. 6 is an exemplary block diagram of a non-secure operating system that operates under the security and management policies enforced by a security management module.

Referring now to FIG. 6, shown therein is an exemplary block diagram of the operating system 134 that operates under the security and management policies provided by the security management module 148. These policies can be initialized upon the first installation of the security management module 148 and later updated by an IT administrator, for example, through a wired connection in some embodiments, through a wireless connection in some embodiments and by either a wired or wireless connection in some embodiments. The operating system 134 also includes the task manager 308 and the API 310 as well as other typical components that are necessary for operation. These components include compilers, utilities for managing computer resources, and the like, as is commonly known by those skilled in the art (these components are not shown to simplify the description).

The security management module 148 includes access information that specifies whether applications can access (i.e. make a function call) a sensitive function in an API. The security management module 148, via the integration module 146, implements a security access protocol such that when functions are called from a sensitive API, either the API or the OS task manager 308 checks with the security management module 148, which in turn checks the access information, to determine if the calling application has been granted access to call that particular function. If access has been granted, then program execution continues to function as it normally would. If access has not been granted, then the security management module 148 will return an error to the calling application. In some embodiments there can be global use of functions in a certain API and in some embodiments use can be permitted depending on the particular calling application. These scenarios are discussed further below.

The access information can be encoded in the security management module 148 and implemented when the module 148 is first installed on the mobile device 100. Installation on the mobile device 100 may occur when the mobile device 100 is manufactured and the access information may then be regularly updated in the future via the connect module 144 by an IT administrator associated with the device 100. In some embodiments, the access information may be stored in a separate file that can be accessed by the security management module 148. Further, in some embodiments, the access information can be encrypted and a private key can be required, for example, to access the security management module 148 and the access information to prevent a third party from violating and modifying the access information. Depending on the implementation, the access information may simply specify a Boolean value for each possible calling application, or may list a number of acceptable applications that may access a sensitive or controlled function provided by an API. In some cases, the calling application may bare a digital signature that identifies it as being authorized to access a particular API function. In this case, the access can be conditional depending on whether the digital signature information matches corresponding information stored in the access information. Accordingly, the security management module 148 can gate access to the API based on the identity of the calling application. In some embodiments, the access information may specify additional conditions of access such as the identity of the user of the mobile device 100.

In use, for the example shown in FIG. 6, the sensitive APIs 310 and 312 will check with the security management module 148 to determine if the calling application is allowed to make a function call. The application 304 will be allowed to make the function call since the access information will indicate that the application 304 can access sensitive APIs. However, the malicious application 306 will not be allowed to make functions calls to functions in either the API 310 or the API 312 since the access information will not list the application 306 as an application that is allowed to make such function calls.

In some embodiments, the security management module 148 also includes execution information on whether an application is allowed to be executed by the operating system 134. Applications can be identified by a unique ID in the execution information and if the execution information indicates that an application is allowed to run, then the OS task manager 308 will execute the application. Conversely, if the execution information does not indicate that an application is allowed to run, then the OS task manager 308 will not execute the application since the application may be a rogue application.

The execution information can be encoded in the security management module 148 and applied to the device 100 when the security management module 148 is first installed. The execution information can then be regularly updated in the future by an IT administrator associated with the device 100 in the same fashion as the access information. The execution information may be coded in a separate file that is accessed by the security management module 148. The execution information may simply contain the ID of each application that is allowed to run or may have a Boolean value associated with a list of applications that indicate which applications are allowed to execute. Alternatively, the application may bare a digital signature that matches corresponding information in the execution information that identifies it as being authorized to execute. The execution information is preferably encrypted so that malicious users cannot access and/or modify the execution information. In some embodiments, the security management module 148 can also remove an application on the device 100 that is not an approved application as indicated by the execution information. In some embodiments, the security management module 148 can prevent installation of non-approved applications.

In use, an application first registers with the OS task manager 308 prior to execution. The OS task manager 308 then checks with the security management module 148 to determine if the application is an "allowable" application (i.e. allowed to execute). In the example shown in FIG. 6, the applications 302 and 304 can be executed by the operating system 134. However, the malicious application 306 will not be executed by the operating system 134 since the execution information will not list the application 306 as an application that is allowed to execute.

As another example illustrating the operation of the mobile device 100, prior to use, or during a later update, an administrator may specify that the application 304 may access one or more functions of the API 310 of the operating system 134 but no functions of API 312 of the application 302. Accordingly, during operation when the application 304 accesses the API 310, the API 310 checks with the security management module 148 to determine if the application 304 has access to the particular function that it is requesting which depends on the settings in the access information. For some functions, the application 304 may be granted access while for others the application 304 may not be granted access. In this case, when the application 304 accesses the API 312, the API 312 checks with the security management module 148 and determines that the application 304 does not have access to any of the functions of the API 312. The API 312 then sends an error message to the function 304.

With regards to the application 306, access to sensitive API functions is not a concern because this application 306 is not given permission to run by the security management module 148. However, in embodiments in which the security management module 148 does not block the execution of applications, the application 306 is not listed as having access to any sensitive API functions in the access information associated with the security management module 148. In this sense, the security management module 148 can provide two layers of security to prevent unauthorized access of sensitive or controlled API functions by applications that may contain malicious code. Accordingly, some embodiments may have either API access control or application control in absence of the other while other embodiments may have both layers of security.

Figure 7:
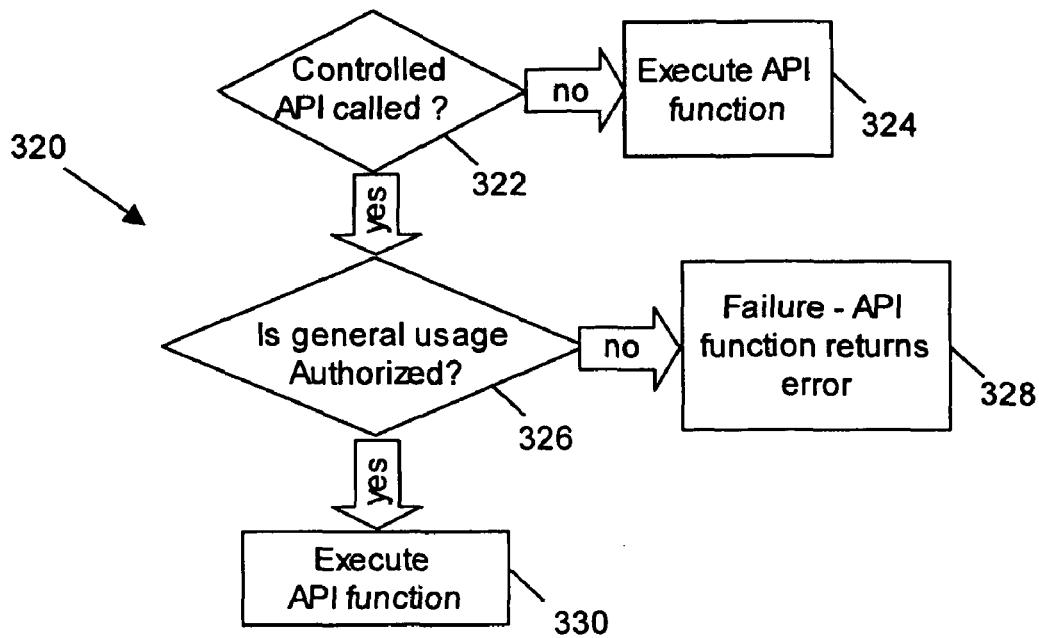
FIG. 7 is a flowchart of an exemplary embodiment of a controlled API access process; and, FIG. 8 is a flowchart of another exemplary embodiment of a controlled API access process.

Referring now to FIG. 7, shown therein is a flowchart of an exemplary embodiment of a controlled API access process 320 that may be implemented by the security management module 148. The process 320 begins at step 322 at which point an API function is called and the process 320 determines whether the called API function is a "controlled" (i.e. sensitive) API function. If not, then at step 324, the API function call is executed. If access to the called API function is being controlled, then the process 320 moves to step 326 in which the application being called checks with the security management module 148 to determine if any application has access to the controlled API function being called (i.e. whether general usage is authorized). If not, then the called API or the security management module 148 returns an error value to the calling application that indicates failure due to the controlled API function being unauthorized for usage. If the controlled API function is authorized for usage, then the process 320 moves to step 330 in which the function call to the controlled API function is executed. This is an example of general security access to the controlled API function since the security management module 148 does not check on the identity of the calling application but rather whether the controlled API function is authorized for general or "global" usage.

Figure 8:
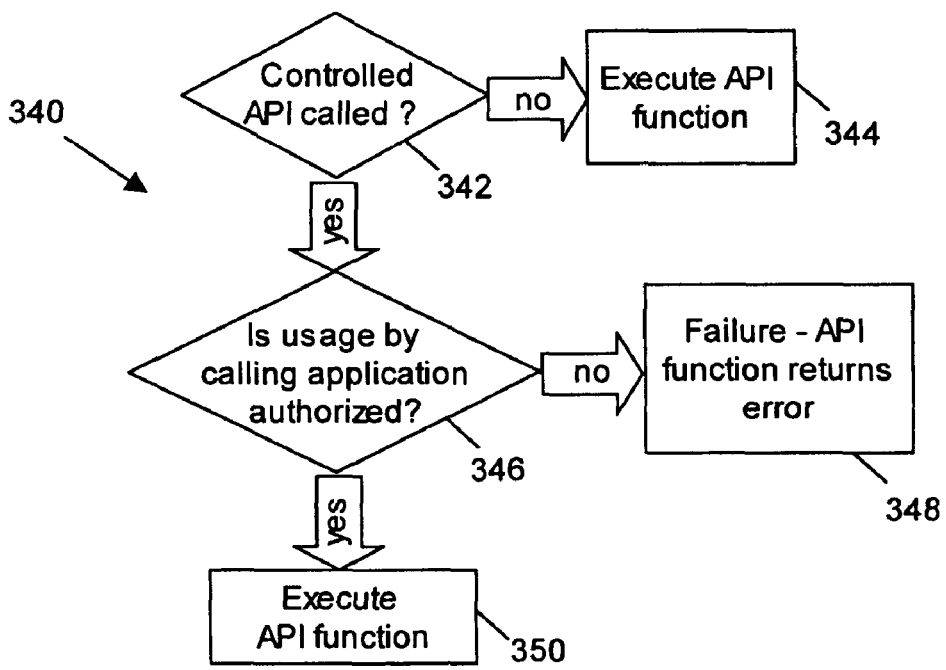

Referring now to FIG. 8, shown therein is a flowchart of an another exemplary embodiment of a controlled API access process 340 that may be implemented by the security management module 148. The process 340 begins at step 342 at which point an API function is called and the process 340 determines whether the called API function is a "controlled" (i.e. sensitive) API function. If not, the process 340 moves to step 344 in which the API function call is executed. Alternatively, if the called API function is controlled, the process 340 moves to step 346 in which the function being called checks with the security management module 148 to determine if the particular calling application has access to the controlled API function. If not, in step 348, the security management module 148 returns an error value that indicates failure due to the controlled API function being unauthorized for usage by the calling application. Alternatively, if the controlled API function is authorized for usage by this particular calling application, then the process 340 moves to step 350 in which the function call to the controlled API function is executed. This is an example of "per application" security access to the controlled API function since the security management module 148 checks the identity of the calling application to determine if it has access to the controlled API function being called.

In some embodiments, access to certain API functions may be allowed for only certain users of the device 100. For instance, some users of the device 100 may have privileges over general users and may require access to the sensitive APIs to change certain features or data associated with these devices that are generally used in a given corporate environment. In this case, the security management module 144 can be updated to provide access to these privileged users, based on a user ID for instance, whereas general users are not given such access.

In some embodiments, the security management module 148 can be used to improve the user authentication features provided by the non-secure operating system 134. For instance, some devices may have an operating system with a built-in user authentication module, but the features of this module may not meet the stringent requirements of the security policies of a given corporation. For instance, there may not be enough control that is offered for certain authentication requirements such as, for example, password length, password form, timeout length for entering a password, change time, and the like. In these situations, the security management module 148 can provide user authentication with adequate security. An IT administrator may then use the security management module 148 to override the built-in authentication module of the operating system 134. A more sophisticated user authentication scheme is then implemented by the security management module 148. The more sophisticated scheme may add user authentication features that are not supported by the built-in authentication scheme. Examples of such features may include additional restrictions on: minimum password length, inactivity time-out before device lock out, how often a user password must be changed, and composition of the user password. This allows an IT administrator to have much greater control over user authentication for a mobile device having a non-secure operating system.

In some embodiments, the security management module 148 can implement a "Device Wipe" function. An important management/security feature for IT administrators is to be able to remotely wipe sensitive data from a mobile device should the device be lost. In this case, the user of the device notifies the IT administrator who then sends a "WIPE" command to the security management module 148 which then deletes any user and corporate sensitive information on the device. The security management module 148 can then delete the portions of the RAM 106 and flash memory 108 that contain the sensitive information.

In some embodiments, the security management module 148 can also provide application feature-specific security. For example, the security management module 148 can support an enable/disable BCC IT Policy. Basically, some financial and government organizations do not allow employees to Blind Carbon Copy recipients when sending e-mail messages for various audit and regulatory reasons. With the security management module 148, the IT Administrator can disable the BCC feature for the message application 138. In this example, the security management module 148 receives a "Disable BCC" command from an IT administrator and interacts with the message application 138 via an appropriate API to remove the BCC field from the e-mail user interface.

Many applications expose APIs that can fundamentally affect the behavior and features of an application. As a result of a particular IT policy command from the security management module 148, a particular application's behavior can be manipulated via its APIs to achieve the desired security result. Disabling the BCC field for the message application 138 is one example. Other examples can include preventing users from dialing certain numbers or viewing certain web pages with a web browser on the mobile device 100, etc. Application-specific feature control can be defined at the time of the design and build of the security management module 148 (i.e. during the design phase, one can define which features an IT administrator can be able to control, and the code to be used with the appropriate application API to implement the control of those features).

The connect module 144 allows the IT administrator to remotely update the security settings implemented by the security management module. In some embodiments, this can be done by the IT administrator via the IT policy module 278. Prior to installation of the modules 144-148, the IT administrator can decide which applications are allowed to execute on the mobile device 100 and which applications, or even users for that matter, are allowed to access certain functions for sensitive APIs. The IT administrator can maintain this security in a central location and can revisit the security issues for a given mobile device 100 at any time in the future. For instance, the IT administrator can routinely review applications that are made by a third party, and if they are not malicious, update the security settings used by the security management module 148. In some embodiments, when an application that is not listed in the control or access information is trying to execute or access a function of a sensitive API, respectively, the security management module 148, via the connect module 144, can contact the IT administrator to determine if the application such be given such execution or access privileges.

The embodiments described herein address mobile devices with operating systems that do not provide a sufficient security framework to provide security features such as at least one of conditional access to sensitive APIs, conditional execution of applications on the mobile device, user authentication, and the like. In some cases, the embodiments described herein can provide an IT administrator, or another suitable person, with security control in operating system environments for which no such controls exist.

In one aspect, at least one embodiment described herein provides a computer program product for providing security features for a mobile device having a non-secure operating system, the computer program product comprising a computer readable medium embodying program code means executable by a processor of the mobile device for carrying out a method for implementing the security features, wherein the program code means comprises:

a) a security management module for providing the security features to the non-secure operating system of the mobile device;

b) a connect module for remotely updating the security features provided by the security management module; and, c) an integration module for interfacing the connect module and the security management module with the non-secure operating system.

In some cases, the method includes providing access information to the security management module, and when a given application being executed on the mobile device makes a function call to an application program interface that provides access to a sensitive function, the method further includes allowing execution of the function call to the sensitive function when the access information indicates that function calls to the sensitive function are allowed, otherwise not allowing execution of the function call to the sensitive function.

In some cases, the method further includes checking the access information to determine if the given application calling the sensitive function is allowed to access the sensitive function.

In some cases, the method further includes providing execution information to the security management module, and prior to execution of a given application by the non-secure operating system, the method further includes checking the execution information and allowing execution of the given application if the given application is indicated as an allowable application in the execution information, otherwise not allowing execution of the given application.

In some cases, the method further includes contacting an administrator if security information is not provided for the given application.

In some cases, the method further includes overriding user authentication features provided by the non-secure operating system with user authentication features provided by the security management module.

In some cases, the method further includes using the security management module to provide application feature-specific security.

In another aspect, at least one embodiment described herein provides a method for providing security features for a mobile device having a non-secure operating system, wherein the method comprises:

a) providing a security management module with one or more security features;

b) providing a connect module for remotely updating the one or more security features; and, c) interfacing the connect module and the security management module with the non-secure operating system.

In some cases, the method further includes providing access information, and when a given application being executed on the mobile device makes a function call to an application program interface that provides access to a sensitive function, the method further includes allowing execution of the function call to the sensitive function when the access information indicates that function calls to the sensitive function are allowed, otherwise not allowing execution of the function call to the sensitive function.

In some cases, the method further includes checking the access information to determine if the given application calling the sensitive function is allowed to access the sensitive function.

In some cases, the method further includes providing execution information, and prior to execution of a given application by the non-secure operating system, the method further includes checking the execution information and allowing execution of the given application if the given application is indicated as an allowable application in the execution information, otherwise not allowing execution of the given application.

In some cases, the method further includes contacting an administrator if security information is not provided for the given application.

In some cases, the method further includes overriding user authentication features provided by the non-secure operating system with user authentication features provided by the security management module.

In some cases, the method further includes using the security management module to provide application feature-specific security.

In another aspect, at least one embodiment described herein provides a mobile communications device having a non-secure operating system. The mobile communications device comprises: a main processor that controls the operation of the mobile communications device; a communication subsystem connected to the main processor, the communication subsystem sends and receives data; at least one application for allowing a user to perform a function on the mobile communications device; at least one application program interface that provides access to a sensitive function; and, a set of applications for providing security features for the non-secure operating system. The set of applications including: a security management module for providing security features to the non-secure operating system of the mobile device; a connect module for remotely updating the security features provided by the security management module; and, an integration module for interfacing the connect module and the security management module with the non-secure operating system.

In some cases, the mobile device further includes access information, and when a given application being executed on the mobile device makes a function call to the at least one application program interface that provides access to a sensitive function, the security management module allows execution of the function call to the sensitive function when the access information indicates that function calls to the sensitive function are allowed, otherwise the security management module does not allow execution of the function call to the sensitive function.

In some cases, the security management module checks the access information to determine if the given application calling the sensitive function is allowed to access the sensitive function.

In some cases, the mobile communications device further includes execution information, and prior to execution of a given application by the non-secure operating system, the security management module checks the execution information and allows execution of the given application if the given application is indicated as an allowable application in the execution information, otherwise the security management module does not allow execution of the given application.

In some cases, the security management module is adapted to override user authentication features provided by the non-secure operating system with user authentication features provided by the security management module.

In some cases, the security management module provides application feature-specific security.

It should be understood that various modifications can be made to the embodiments described and illustrated herein, without departing from the embodiments described herein, the scope of which is defined in the appended claims.

The invention claimed is:

1. A computer program product for providing security features for a mobile device having a non-secure operating system, the computer program product comprising a non-transitory computer readable medium embodying program code means executable by a processor of the mobile device, wherein the program code means comprises:
    a security management module for providing the security features to the non-secure operating system of the mobile device;
    a connect module for remotely updating the security features provided by the security management module; and,
    an integration module for interfacing the connect module and the security management module with the non-secure operating system, wherein the integration module integrates application programming interfaces of the connect module with host environment application programming interfaces and provides security services to the mobile device via the application programming interfaces of the connect module to augment the behavior of the host environment application programming interfaces and the mobile device in order to affect the security capabilities of the non-secure operating system; and
    wherein the program code means further comprises instructions for:
    providing access information and execution information to the security management module, the access information comprising information specifying whether applications on the mobile device can access a sensitive function of one of the host environment application programming interfaces and the execution information comprising information on whether an application on the mobile device is allowed to be executed by the non-secure operating system;
    when a given application being executed on the mobile device makes a function call to an application program interface that provides access to a sensitive function, allowing execution of the function call to the sensitive function when the access information indicates that function calls to the sensitive function by the given application are allowed, otherwise not allowing execution of the function call to the sensitive function; and
    when a given application is to be executed on the mobile device, allowing execution of the given application when the execution information indicates that the given application is an allowable application, otherwise not allowing execution of the given application.

2. The computer product of claim 1, wherein the program code means further comprises instructions for contacting an administrator if security information is not provided for the given application.

3. The computer product of claim 1, wherein the program code means further comprises instructions for overriding user authentication features provided by the non-secure operating system with user authentication features provided by the security management module.

4. The computer product of claim 1, wherein the program code means further comprises instructions for using the security management module to provide application feature-specific security.

5. The computer product of claim 1, wherein the connect module is configured to provide secure communication with a host system.

6. A method for providing security features for a mobile device having a non-secure operating system, wherein the method comprises:
 providing a security management module with one or more security features;
 providing a connect module for remotely updating the one or more security features;
 interfacing the connect module and the security management module with the non-secure operating system by integrating application programming interfaces of the connect module with host environment application programming interfaces and providing security services to the mobile device via the application programming interfaces of the connect module to augment the behavior of the host environment application programming interfaces and the mobile device in order to affect the security capabilities of the non-secure operating system;
 providing access information and execution information to the security management module, the access information comprising information specifying whether applications on the mobile device can access a sensitive function of one of the host application programming interfaces and the execution information comprising information on whether an application on the mobile device is allowed to be executed by the non-secure operating system;
 when a given application being executed on the mobile device makes a function call to an application program interface that provides access to a sensitive function, allowing execution of the function call to the sensitive function when the access information indicates that function calls to the sensitive function by the given application are allowed, otherwise not allowing execution of the function call to the sensitive function; and
 when a given application is to be executed on the mobile device, allowing execution of the given application when the execution information indicates that the given application is an allowable application, otherwise not allowing execution of the given application.

7. The method of claim 6, wherein the method further comprises contacting an administrator if security information is not provided for the given application.

8. The method of claim 6, wherein the method further comprises overriding user authentication features provided by the non-secure operating system with user authentication features provided by the security management module.

9. The method of claim 6, wherein the method further comprises using the security management module to provide application feature-specific security.

10. The method of claim 6, wherein the method further comprises configuring the connect module to provide secure communication with a host system.

11. A mobile communications device having a non-secure operating system, wherein the mobile communications device comprises:
 a main processor that controls the operation of the mobile communications device;
 a communication subsystem connected to the main processor, the communication subsystem sends and receives data;
 at least one application for allowing performance of a function on the mobile communications device;
 at least one application program interface that provides access to a sensitive function; and,
 a set of applications for providing security features for the non-secure operating system, the set of applications comprising:
  a security management module for providing security features to the non-secure operating system of the mobile device;
  a connect module for remotely updating the security features provided by the security management module; and, an integration module for interfacing the connect module and the security management module with the non-secure operating system, wherein the integration module integrates application programming interfaces of the connect module with host environment application programming interfaces and provides security services to the mobile device via the application programming interfaces of the connect module to augment the behavior of the host environment application programming interfaces and the mobile device in order to affect the security capabilities of the non-secure operating system;
 wherein the mobile device further comprises access information and execution information, the access information comprising information specifying whether applications on the mobile device can access a sensitive function of one of the host application programming interfaces and the execution information comprising information on whether an application on the mobile device is allowed to be executed by the non-secure operating system;
 wherein the security management module is arranged to allow execution of a function call to a sensitive function when a given application being executed on the mobile device makes a function call to the at least one application program interface that provides access to the sensitive function when the access information indicates that function calls to the sensitive function by the given application are allowed, otherwise the security management module is arranged not to allow execution of the function call to the sensitive function; and
 wherein the security management module is arranged to allow execution of a given application when a given application is to be executed on the mobile device when the execution information indicates that the given application is an allowable application, otherwise the security management module is arranged not to allow execution of the given application.

12. The device of claim 11, wherein the security management module is adapted to override user authentication features provided by the non-secure operating system with user authentication features provided by the security management module.

13. The device of claim 11, wherein the security management module provides application feature-specific security.

14. The device of claim 11, wherein the connect module is configured to provide secure communication with a host.

15. The device of claim 11, wherein the security management module is adapted to contact an administrator if security information is not provided for the given application.

* * * * *